June 5, 1962
A. H. WAKEMAN
3,037,748
AGITATOR CONSTRUCTION
Filed June 6, 1958
2 Sheets-Sheet 1
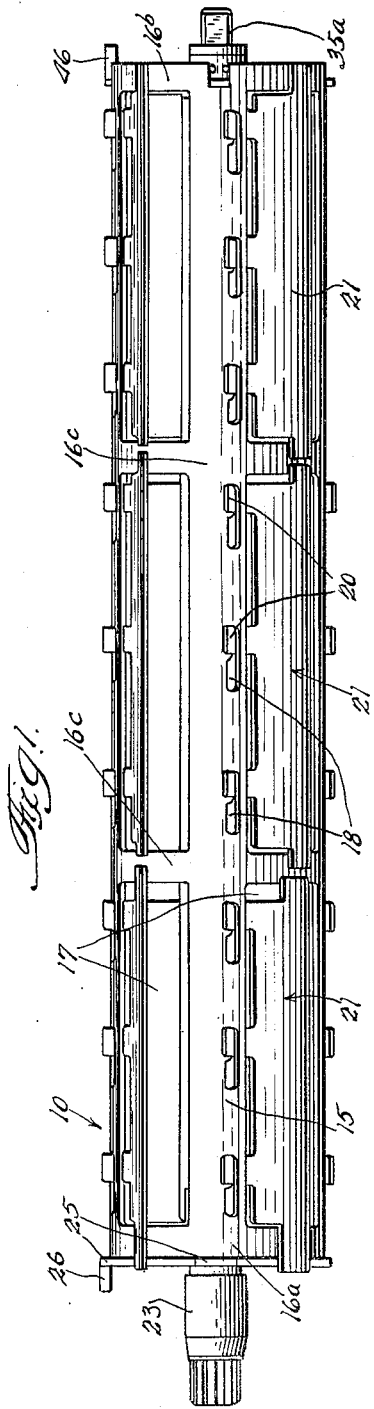
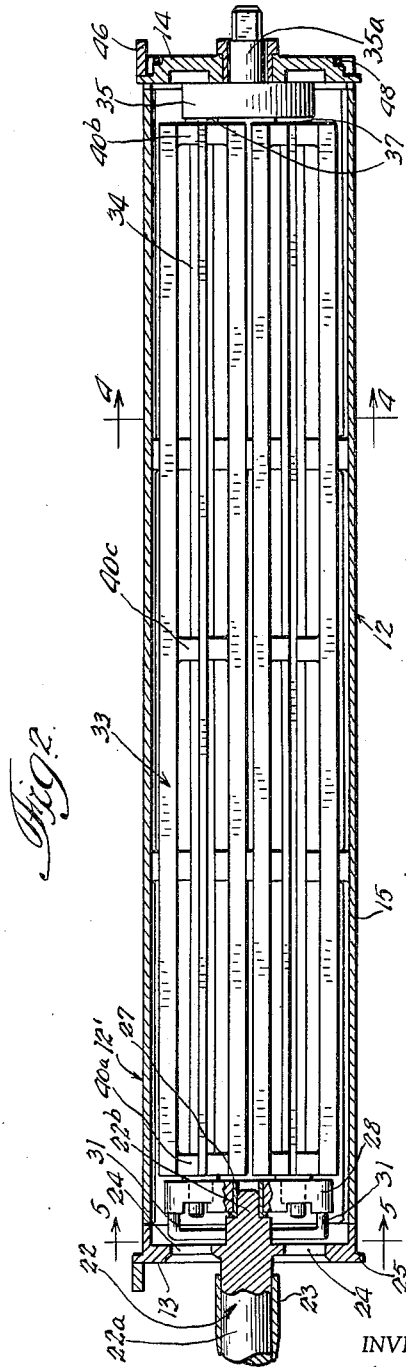
INVENTOR.
Alden H. Wakeman.
BY

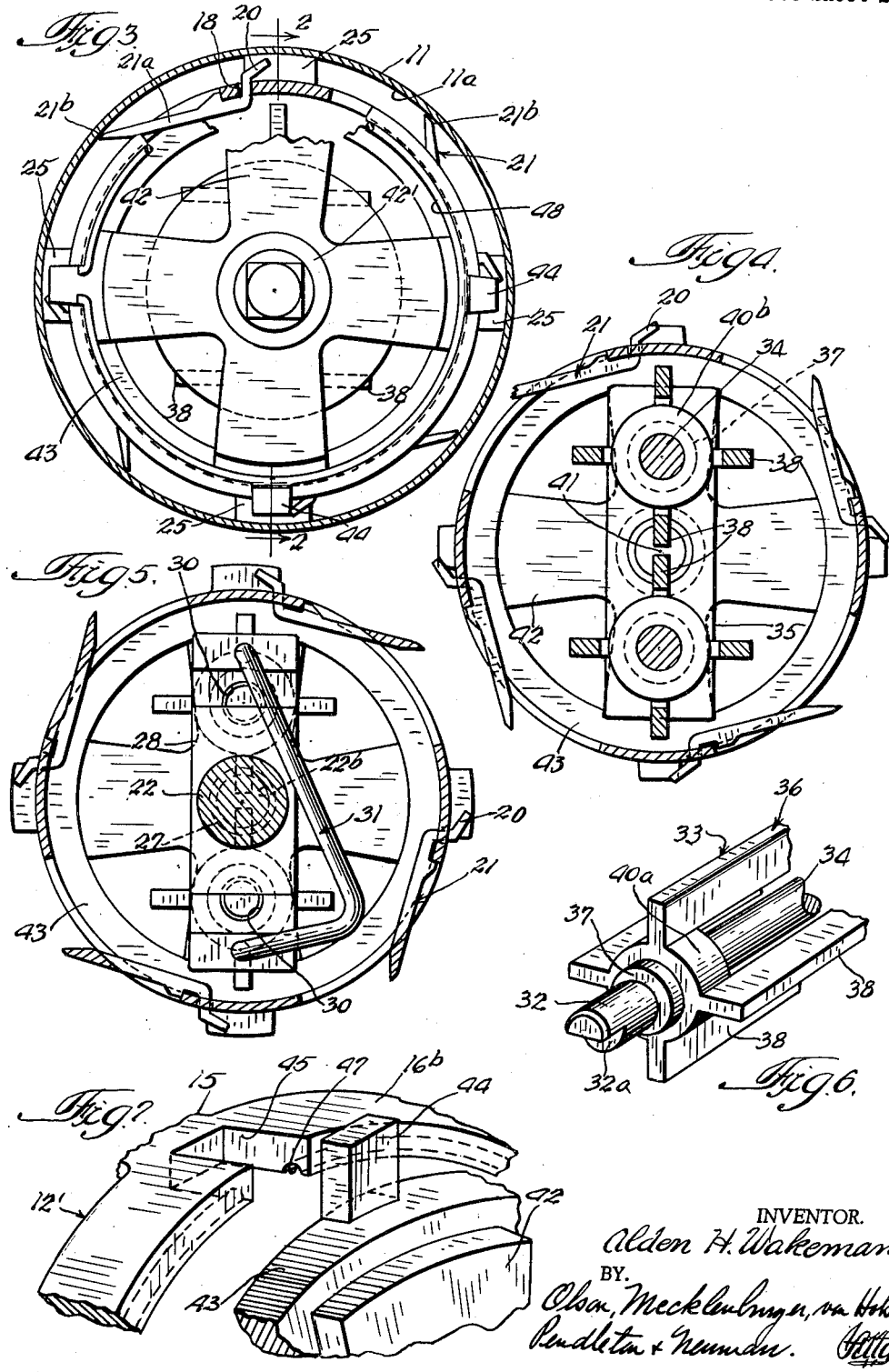

United States Patent Office 3,037,748
Patented June 5, 1962

3,037,748
AGITATOR CONSTRUCTION
Alden H. Wakeman, Lake Mills, Wis., assignor to The Creamery Package Mfg. Company, Chicago, Ill., a corporation of Illinois
Filed June 6, 1958, Ser. No. 740,353
4 Claims. (Cl. 259—109)

This invention relates to an agitator construction and, more particularly, to an agitator construction adapted for use in aerating ice cream mix or the like in a continuous-type ice cream freezer.

In the manufacture of ice cream or the like, the control of overrun, that is, the percentage of air by volume in the product, is most critical because of the pronounced effect such overrun has on the palatable character and texture of the final product and, furthermore, because of the necessity of meeting Pure Food Regulations requiring a minimum of solids by weight per gallon of product.

Heretofore, in large capacity continuous-type ice cream freezers, extreme difficulty has been encountered in attaining proper overrun control. This difficulty stems in large part from the ineffective whipping or agitating of the product while the latter is passing through the freezer cylinder. In an effort to correct this problem, the flow velocity of the product through the apparatus is sometimes reduced, thereby causing the product to be subjected to whipping by the agitator for a longer period of time or, on the other hand, the size of the apparatus is materially increased by either lengthening the freezer cylinder or increasing the number of freezer cylinders. In either case, such a corrective step is undesirable because, on the one hand, the capacity of the apparatus is diminished or, on the other hand, the cost of the apparatus greatly increased.

To effect proper overrun control it is necessary that the product, while passing through the refrigerated cylinder, be uniformly cooled and, at the same time, agitated. By proper agitation, all the particles of the product are caused to be brought into contact with the refrigerated surface of the cylinder whereupon the requisite amount of heat transfer takes place between the product and the cylinder surface. Furthermore, the air or gas particles which are introduced at the inlet end of the cylinder must be broken up into minute, substantially uniform size and distributed in a homogeneous fashion throughout the product, so that the latter will be possessed of stability when packaged for storage or shipment.

In prior agitator constructions, this result could not readily be obtained because the design of the agitator was such as to produce voids, or was not effective in providing vigorous agitation throughout the entire cross-sectional area of the freezer cylinder, through which the product passed.

Thus, it is an object of the present invention to provide an improved agitator construction which, even when incorporated in a large capacity continuous-type ice cream freezer, produces accurate overrun control.

It is a still further object of this invention to provide an agitator construction which is of simple, yet sturdy, design, effective in operation, and may be readily assembled and disassembled for cleaning.

It is a further and important object of this invention to provide an agitator assembly which is adapted for use with freezers now in operation.

Further and additional objects will appear from the description, accompanying drawings, and appended claims.

In accordance with one embodiment of this invention, an improved agitator construction is provided for use in combination with an elongated cylindrically-shaped chamber. The agitator comprises an elongated skeletal member disposed within the chamber and rotatable about its longitudinal axis. Positioned within the interior of the skeletal member are a plurality of agitating units which have the longitudinal axes thereof parallel to and spaced from the longitudinal axis of said skeletal member. The agitating units are rotatable about their longitudinal axes independently of said skeletal member. The outer peripheries of said agitating units are in close proximity to one another and cooperate with said skeletal member to produce an agitated area substantially equal to the flow area of said chamber.

For a more complete understanding of this invention, reference should be made to the drawings, wherein:

FIGURE 1 is a side elevational view of the improved agitator.

FIG. 2 is a vertical sectional view of the improved agitator shown in FIG. 1.

FIG. 3 is an enlarged right end view of the agitator shown in FIG. 1, in combination with a chamber, the latter being shown in section.

FIG. 4 is an enlarged sectional view taken along line 4—4 of FIG. 2.

FIG. 5 is an enlarged sectional view taken along line 5—5 of FIG. 2.

FIG. 6 is an enlarged fragmentary perspective end view of one of the agitating units.

FIG. 7 is an enlarged fragmentary perspective view of one end of the skeletal member with an end plate thereof shown in disassembled relation.

Referring now to the drawings (FIGS. 1 and 2) an improved agitator 10 is shown which is adapted primarily for use in combination with an elongated cylindrically-shaped chamber 11 (see FIG. 3). Where the agitator 10 is utilized in a continuous-type ice cream freezer, the chamber 11 constitutes a refrigerated cylinder through which ice cream mix and air are introduced at one end and pass in a longitudinal direction through the cylinder while the mix becomes aerated by the agitator. By way of simplifying understanding of the invention, the agitator 10 will be described in relation to an ice cream freezer. It is to be understood, of course, that such description, in relation to the freezer, is merely by way of illustration and not to be taken as limiting the invention.

The improved agitator 10, in this instance, comprises an elongated skeletal member 12 mounted within chamber 11 for rotation about its longitudinal axis. Member 12 is formed of an open frame section 12' (see FIG. 2) and a pair of end plates 13 and 14. Frame section 12' includes a plurality of elongated narrow bridging segments 15 which are maintained in symmetrically spaced relation with respect to the axis of the agitator by end collars 16a and 16b and intermediate collars 16c (see FIG. 1). The openings or voids 17 formed between segments 15 permit the product flowing through the cylinder 11 to move between the interior of member 12 and the interior refrigerated surface 11a of chamber 11.

Formed in longitudinally spaced relation on each segment 15 are a plurality of elongated slots 18 which are adapted to removably accommodate a plurality of lugs 20, the latter being formed on a plurality of scraper blades 21. The blades 21 are of conventional design and are carried by member 12 and extend angularly from the outer periphery of frame section 12'. Each blade 21 has an elongated flat body portion 21a, with the outer edge 21b thereof sharpened and disposed in close proximity to surface 11a of chamber 11 (see FIG. 3). Upon rotation of agitator 10, the edges 21b of the blades 21 will prevent the build-up of any crustations on surface 11a and urge the flowing product in a direction toward the center axis of chamber 11 and thus maintain efficient heat transfer through the surface. Formed integral with collar 16a of frame section 12' is end plate 13 which is provided with a centrally disposed laterally extending stud 22. One end portion 22a of stud 22 extends longitudinally outwardly from plate 13 and is adapted to be disposed within a bearing, not shown, formed in the end wall of chamber 11. Encompassing a part of stud portion 22a is a seal 23. End portion 22a may be provided with exterior splines, as shown in FIG. 1, whereby rotational driving force may be applied.

The opposite end portion 22b of stud 22 is reduced in size and extends inwardly into the interior of the skeletal frame section 12' (see FIG. 2). The function of end portion 22b will be described more fully hereinafter. End plate 13 is disposed adjacent the end of the chamber 11 through which the mix and air are introduced into chamber 11.

A plurality of openings 24 are formed in plate 13 and disposed in symmetrically spaced relation about stud 22 (see FIG. 2). These openings permit the mix and air to enter the interior of the frame section 12'. Formed on the outer periphery of end plate 13, and extending radially therefrom, are a plurality of lugs 25, which are adapted to slidably engage the interior surface 11a of chamber 11 and thus guide the agitator 10 while assembled or disassembled with respect to chamber 11. Extending at a right angle from one or more of these lugs 25 is a wiper finger 26, which is adapted to wipe the surface of chamber 11 disposed between the end wall of the chamber and the perforated portion of end plate 13 (see FIG. 1).

Encompassing the reduced end 22b of stud 22 of end plate 13 is a bushing 27, the latter being disposed within a central opening formed in a carriage member 28 (see FIG. 2). Carriage member 28, as seen more clearly in FIG. 5 is, in this instance, of substantially rectangular configuration and is disposed within the interior of frame section 12'. Member 28 has formed in one face thereof a pair of diametrically opposed openings 30 which are adapted to accommodate end portions 32 of axles 34, the latter forming parts of a pair of agitating units 33 disposed within the interior of frame section 12'. To the opposite face of member 28 is affixed a curvilinear wiper bar 31. The purpose of bar 31 is to effect agitation of the product disposed within the interior of frame section 12' between end plate 13 and carriage member 28.

It will be noted in FIG. 6 that each end portion 32 is undercut at 32a and thus the opening 30 formed in carriage member 28 to accommodate such end portion has a configuration to conform thereto and thus the axle 34 is held in a nonrotating position once it is assembled in member 28. The other ends of axles 34 are supported by and permanently affixed to a second carriage member 35 (see FIG. 2) which is similar in configuration to member 28.

Each agitating unit 33, in this instance, comprises, in addition to axle 34, a beater section 36 which is adapted to rotate independently about axle 34. Suitable bushings 37 are disposed between section 36 and axle 34 (see FIG. 6). Each beater section 36 includes a plurality of elongated radially extending vanes 38 (see FIG. 6) which are shown as being disposed in symmetrically spaced relation about axle 34. This arrangement can be modified and is illustrative only of an embodiment. The vanes 38 are retained in proper spaced relation by a plurality of collars 40a, 40b and 40c which encompass axle 34.

When units 33 are in assembled relation within the frame section 12', the beater sections 36 are in such relative position that the outer edges of the corresponding radially extending vanes 38 will pass in close proximity to one another in the vicinity of the axis of rotation of the frame section 12'. As seen in FIG. 4, only a slight amount of clearance 41 is provided between beater sections 36 and thus vigorous whipping and agitating of the product occurs in this vicinity because the corresponding vanes 38 of the beater sections 36 are moving in opposite directions upon the frame section 12' being driven in one direction. The rotation of the beater sections 36, which is independent of frame section 12', is due to reactive forces exerted on the vanes by the product disposed within cylinder 11. While only two units 33 are shown disposed within the frame section 12', it is to be understood, of course, that additional units may be provided, if desired. However, it has been found that in a large capacity continuous-type ice cream freezer, accurate overrun control of the product is attained with but a pair of agitating units when positioned in the manner as shown in FIG. 4. Furthermore, while the beater sections 36 are free to rotate independently of one another, it is to be understood that such sections 36 may, if desired, be positively driven simultaneously with the frame section 12'.

End plate 14, shown in FIG. 3, is adapted to be removed endwise from frame section 12' and thus permit access to agitating units 33. The end plate 14 comprises a plurality of radially extending arms 42 which are interconnected to one another by a hub 42' and an outer ring-like collar 43. Extending radially and disposed in symmetrically spaced relation about the periphery of end plate 14 are a plurality of lugs 44 which, as seen in FIG. 7, are adapted to be disposed within suitable cutouts 45 formed in the collar portion 16b of frame section 12'. The lugs 44 cooperate with the cutouts 45 and thus prevent relative rotational movement between end plate 14 and frame section 12'. It will be noted that a portion of the collar 16b projects beyond lugs 44, when the latter are disposed in cutouts 45, and is provided with an internal groove 47 for receiving a locking ring 48, shown more clearly in FIG. 3. Thus, once the end plate 14 is in assembled relation with respect to collar 16b, ring 48 is positioned within groove 47 and thus prevents endwise movement of the plate with respect to the frame section 12'. The spacing between arms 42 permits flow of the aerated product from the interior of frame section 12' and out through a discharge port, not shown, in the end wall cylinder 11.

The second carriage member 35, to which the corresponding ends of axles 34 are affixed, is provided with an outwardly extending stud 35a which is adapted to extend through a suitable opening formed in end plate 14 (see FIG. 2). The projecting end of stud 35a is faceted and is adapted to fit within a suitable bearing, not shown, formed in the cylinder end wall. By reason of the stud end 35a being faceted, the carriage members 28 and 35 and axles 34 are held in a fixed nonrotating position, while the frame section 12' is positively driven in one direction.

With the construction as described, the heavy portion of the ice cream mix, which is normally forced to the outer area of the freezer cylinder due to centrifugal force resulting from rotation of assembly, is caused to be moved into the central area of the cylinder by the scraper blades 21, whereupon it is subjected to vigorous agitation by units 33. Also, air and the aerated portion of the mix, which would normally remain in the center portion of the cylinder due to its relative light density, are moved toward the outer area of the cylinder interior by units 33 and intimately intermixed with the heavier portion of the mix, whereby more effective heat exchange between the product and refrigerated surface of the cylinder results.

It is very important that this intermixture of the air, aerated and heavier portions of the mix be accomplished uniformly and continuously within a very short period of time. This is necessary in order to produce continuously, as the mix and air move through the freezer cylinder, a uniform product and consequent desired overrun control of the finished product. It is important that the combined agitation of the agitator units produce an area of agitation which is substantially equal to the total flow area of the cylinder whereby a substantially uniform intermixture of the air and liquid mix will be effected and produce accurate overrun of the finished product.

Thus, it will be seen that an improved agitator construction has been provided which is simple, yet sturdy, in construction, is most effective in causing vigorous agitation of the product and controlled overrun, and is readily assembled and disassembled for cleaning.

While a particular embodiment of this invention is shown above, it will be understood, of course, that the invention is not to be limited thereto, since many modifications may be made and it is contemplated, therefore, by the appended claims, to cover any such modifications as fall within the true spirit and scope of this invention.

I claim:

1. A device of the class described adapted for use with a continuous-type ice cream freezer having an elongated cylindrically-shaped freezing chamber; said device comprising a hollow skeletal agitator member defining a generally cylindrical interior compartment and rotatably mounted within said chamber; and a plurality of elongated rotatable reaction agitator elements disposed in said compartment with their longitudinal axes parallel to and spaced from the longitudinal axis of said skeletal agitator member and each having an effective diameter generally equal to but less than the radial clearance in said cylindrical compartment; each of said agitator elements being mounted on supports carried by said chamber and being freely rotatable about a longitudinal axis fixed relatively to said chamber in reaction to product flow in said compartment and each disposed to substantially span and rotate within the radial clearance of such skeletal agitator member.

2. A device of the class described adapted for use with a continuous-type ice cream freezer having an elongated cylindrically-shaped freezing chamber; said device comprising a hollow skeletal agitator member defining a generally cylindrical unobstructed interior compartment and rotatably mounted within said chamber; and a pair of elongated rotatable reaction agitator elements symmetrically arranged in said compartment with their longitudinal axes parallel to and spaced from the longitudinal axis of said skeletal agitator member and each having an effective diameter generally equal to but less than the radius of said cylindrical compartment; each of said agitator elements being mounted on fixed supports carried by said chamber and being freely rotatable about a longitudinal axis fixed relatively to said chamber in reaction to product flow in said compartment, and each disposed to extend closely adjacent the longitudinal axis of said compartment and the peripheral edge of the other agitator element when rotated.

3. A device of the class described adapted for use with a continuous-type ice cream freezer having an elongated cylindrically-shaped freezing chamber through which a product is caused to flow, said device comprising an elongated generally cylindrical hollow skeletal member rotatably mounted within said chamber; said member having means at one end thereof for applying force thereto to effect rotation of said member about its longitudinal axis, the hollow interior of said skeletal member comprising an elongated generally cylindrical compartment; a plurality of elongated reaction agitator elements freely and independently rotatably mounted within the hollow interior of said skeletal member with the longitudinal axis of each of said elements generally parallel to and spaced from the longitudinal axis of said skeletal member, the peripheral edges of each of said agitator elements spaced from the axis of the respective element a distance to describe a circular path of a diameter substantially equal to but less than the radial clearance in said compartment when such element is rotated, each of said elements disposed to substantially span and rotate within the radial clearance of said compartment; and support means including supports adjacent opposite ends of said skeletal member and means disposed axially of said skeletal member for retaining said supports in fixed non-rotating position for supporting said agitating elements with their longitudinal axes in fixed positions relative to said chamber, whereby said agitator elements are reactively rotatable by such product passing through said compartment.

4. A device of the class described adapted for use with a continuous-type ice cream freezer having an elongated cylindrically-shaped freezing chamber, through which a product is caused to flow, said device comprising an elongated generally cylindrical hollow skeletal member rotatably mounted within said chamber; said member having means at one end thereof for applying force thereto to effect rotation of said member about its longitudinal axis, the hollow interior of said skeletal member comprising an elongated unobstructed generally cylindrical compartment; a pair of elongated reaction agitator elements freely and independently rotatably mounted and symmetrically arranged within the hollow interior of said skeletal member with the longitudinal axis of each of said elements generally parallel to and spaced from the longitudinal axis of said skeletal member, the peripheral edges of each of said agitator elements spaced from the axis of the respective element a distance to describe a circular path of a diameter substantially equal to but less than the radius of said compartment when such element is rotated, each of said elements disposed to extend closely adjacent the longitudinal axis of said compartment and the peripheral edge of the other agitator element when rotated, whereby said elements substantially span a diameter of said compartment; and support means including supports adjacent opposite ends of said skeletal member and means disposed axially of said skeletal member for retaining said supports in fixed non-rotating position for supporting said agitating elements with their longitudinal axes in fixed positions relative to said chamber, whereby said agitator elements are reactively rotatable by such product passing through said compartment.

References Cited in the file of this patent

UNITED STATES PATENTS

| | | |
|---|---|---|
| 855,364 | Tyson | May 28, 1907 |
| 1,880,731 | Boileau | Oct. 4, 1932 |
| 2,210,366 | Godfrey et al. | Aug. 6, 1940 |
| 2,278,340 | Weinreich et al. | Mar. 31, 1942 |
| 2,283,487 | Boileau | May 19, 1942 |
| 2,289,613 | Weinreich | July 14, 1942 |
| 2,689,113 | Merrill | Sept. 14, 1954 |